US011423264B2

(12) United States Patent
Badjatiya et al.

(10) Patent No.: US 11,423,264 B2
(45) Date of Patent: Aug. 23, 2022

(54) ENTROPY BASED SYNTHETIC DATA GENERATION FOR AUGMENTING CLASSIFICATION SYSTEM TRAINING DATA

(71) Applicant: Adobe Inc., San Jose, CA (US)

(72) Inventors: Pinkesh Badjatiya, Ujjain (IN); Nikaash Puri, New Delhi (IN); Ayush Chopra, Pitampura (IN); Anubha Kabra, Jaipur (IN)

(73) Assignee: Adobe Inc., San Jose, CA (US)

( * ) Notice: Subject to any disclaimer, the term of this patent is extended or adjusted under 35 U.S.C. 154(b) by 479 days.

(21) Appl. No.: 16/659,147

(22) Filed: Oct. 21, 2019

(65) Prior Publication Data
US 2021/0117718 A1   Apr. 22, 2021

(51) Int. Cl.
*G06K 9/62* (2022.01)
*G06N 20/10* (2019.01)

(52) U.S. Cl.
CPC .......... *G06K 9/628* (2013.01); *G06K 9/6228* (2013.01); *G06K 9/6256* (2013.01); *G06K 9/6287* (2013.01); *G06N 20/10* (2019.01)

(58) Field of Classification Search
CPC .. G06K 9/6228; G06K 9/6231; G06K 9/6256; G06K 9/6271; G06K 9/628; G06K 9/6287; G06K 9/629; G06N 20/00; G06N 20/10; G06N 3/0454; G06N 3/08; G06N 7/005; G06V 10/82
See application file for complete search history.

(56) References Cited

U.S. PATENT DOCUMENTS

| | | | | |
|---|---|---|---|---|
| 2020/0202210 A1* | 6/2020 | Kushnir | | G06N 3/08 |
| 2020/0349425 A1* | 11/2020 | Saha | | G06N 3/08 |
| 2021/0056417 A1* | 2/2021 | Zhang | | G06F 7/24 |

OTHER PUBLICATIONS

Aytar et al: "SoundNet: Learning Sound Representations from Unlabeled Video", NIPS, 2016 (Year: 2016).*
Tokozume et al: "Learning From Between-Class Examples for Deep Sound Recognition", arXiv, 2018 (Year: 2018).*
Abdi,"To Combat Multi-Class Imbalanced Problems by Means of Over-Sampling Techniques", IEEE transactions on Knowledge and Data Engineering 28, 1, Jan. 2016, pp. 238-251.

(Continued)

*Primary Examiner* — Ruiping Li
(74) *Attorney, Agent, or Firm* — FIG. 1 Patents

(57) ABSTRACT

A data classification system is trained to classify input data into multiple classes. The system is initially trained by adjusting weights within the system based on a set of training data that includes multiple tuples, each being a training instance and corresponding training label. Two training instances, one from a minority class and one from a majority class, are selected from the set of training data based on entropies for the training instances. A synthetic training instance is generated by combining the two selected training instances and a corresponding training label is generated. A tuple including the synthetic training instance and the synthetic training label is added to the set of training data, resulting in an augmented training data set. One or more such synthetic training instances can be added to the augmented training data set and the system is then re-trained on the augmented training data set.

20 Claims, 5 Drawing Sheets

(56) References Cited

OTHER PUBLICATIONS

Al-Shahib,"Feature Selection and the Class Imbalance Problem in Predicting Protein Function from Sequence", Feb. 2005, 22 pages.
Burez,"Handling class imbalance in customer churn prediction", Apr. 2009, pp. 4626-4636.
Chawla,"SMOTE: Synthetic Minority Over-sampling Technique", Jun. 2, 2002, 37 pages.
Chawla,"SMOTEBoost: Improving Prediction of the Minority Class in Boosting", In European conference on principles of data mining and knowledge discovery., Jan. 2003, 12 pages.
Elkan,"The Foundations of Cost-Sensitive Learning", In International joint conference on artificial intelligence, vol. 17. Lawrence Erlbaum Associates Ltd, Aug. 2001, 6 pages.
Fernandez,"SMOTE for learning from imbalanced data: progress and challenges, marking the 15-year anniversary", Apr. 2018, 43 pages.
Galar,"A Review on Ensembles for the Class Imbalance Problem: Bagging-, Boosting-, and Hybrid-Based Approaches", Jul. 2012, 23 pages.
Garcia,"Evolutionary Undersampling for Classification with Imbalanced Datasets Proposals and Taxonomy", Nov. 20, 2009, pp. 275-306.
Han,"Borderline-SMOTE: A New Over-Sampling Method in Imbalanced Data Sets Learning", Sep. 2005, pp. 878-887.
He,"ADASYN: Adaptive Synthetic Sampling Approach for Imbalanced Learning", Jun. 2008, pp. 1322-1328.
Kubat,"Addressing the Curse of Imbalanced Training Sets: One-Sided Selection", Jan. 1997, 8 pages.
Rostami,"Extracting Predictor Variables to Construct Breast Cancer Survivability Model with Class Imbalance Problem", Jul. 2018, 15 pages.
Sharma,"Synthetic oversampling with the majority class: A new perspective on handling extreme imbalance", Nov. 2018, 10 pages.
Summers,"Improved Mixed-Example Data Augmentation", Jan. 19, 2019, 9 pages.
Tanaka,"Data Augmentation Using GANs", Apr. 19, 2019, 16 pages.
Tokozume,"Between-class Learning for Image Classification", Apr. 8, 2018, 11 pages.
Wang,"A Fast-Distributed Classification Algorithm for Large-scale Imbalanced Data", Dec. 2016, pp. 1251-1256.
Wang,"Resampling-based ensemble methods for online class imbalance learning", May 2015, pp. 1356-1368.
Zhang,"Mixup: Beyond Empirical Risk Minimization", Apr. 27, 2018, 13 pages.

* cited by examiner

ENTROPY BASED SYNTHETIC DATA GENERATION FOR AUGMENTING CLASSIFICATION SYSTEM TRAINING DATA

BACKGROUND

As computing technology has advanced so too have the uses for computing devices. One such use is data classification systems. Data classification systems receive input data and classify the data as belonging to one or more of multiple classes. Data classification systems can be used for a variety of different purposes, such as to personalize content for users, perform fault detection, perform disease classification, predict customer churn, and so forth.

While data classification systems provide many benefits, they are not without their problems. One such problem is that many data sets are imbalanced, which refers to the classification categories not being approximately equally represented. For example, a data classification system may select content (e.g., offers or experiences) to provide to users that the users are predicted to like based on conversions from historical data (which is the data set). The typical conversion rate may be lower than 1 percent, meaning that on average for every 99 examples of class 0 (not converted) there is a single example of class 1 (converted). Accordingly, the data set is an imbalanced data set. The class to which the majority of examples belongs is referred to as the majority class, and the class to which the minority of examples belongs is referred to as the minority class.

Creating a data classification system to properly classify input data when the data set is imbalanced is challenging. One approach to creating such a data classification system is to generate synthetic training data and train the data classification system based in part on the synthetic training data. These conventional solutions, however, generate synthetic training data that may not belong to the minority class. If a large amount of the synthetic training data does not belong to the minority class, then the accuracy of the data classification system can be adversely affected because the imbalance in the data set remains.

SUMMARY

To mitigate the drawbacks of conventional solutions for generating synthetic training examples, an entropy based data augmentation system is described. A training data set including multiple training instances is obtained. Each training instance includes training data and has a corresponding training label. A first subset of the multiple training instances is in a minority class and a second subset of the multiple training instances is in a majority class. A data classification system is trained by applying the training data set to the data classification system and adjusting weights within the data classification system based on the training data set. For each of at least two of the multiple training instances, an entropy of the training instance is determined. A first training instance from the first subset and a second training instance from the second subset are selected based on the entropies of the training instances. A synthetic training instance is generated by combining the first training instance and the second training instance. A synthetic training label is generated for the synthetic training instance based on a training label for the first training instance and a training label for the second training instance. The training data set is augmented with a tuple including the synthetic training instance and the synthetic training label, resulting in an augmented training data set. The data classification system is re-trained by applying the augmented training data set to the data classification system and adjusting weights within the data classification system based on the augmented training data set.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
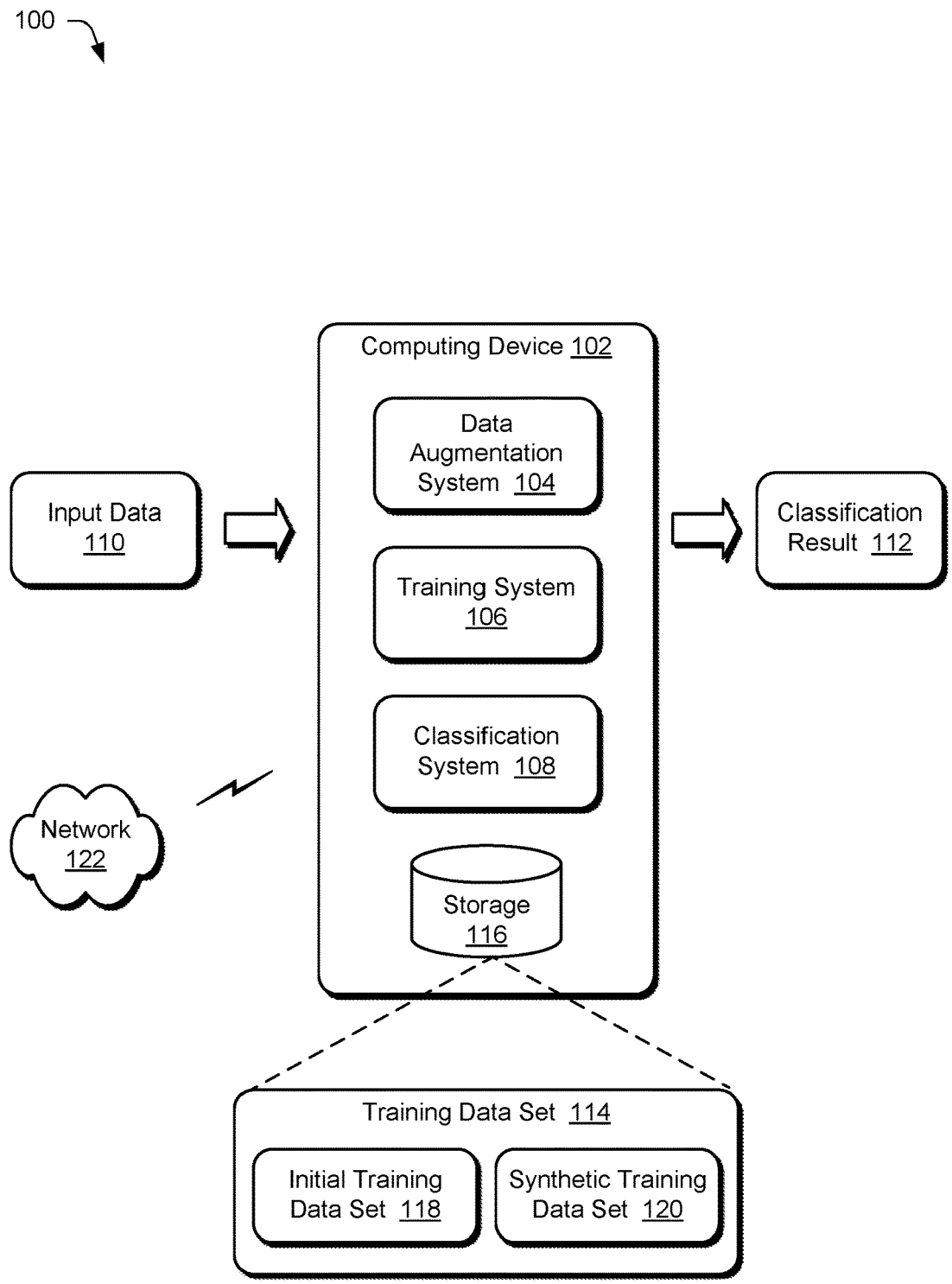
FIG. 1 is an illustration of a digital medium environment in an example implementation that is operable to employ the entropy based synthetic data generation for augmenting classification system training data described herein.

Techniques for entropy based synthetic data generation for augmenting classification system training data are discussed herein. A data classification system is trained to classify input data into two or more classes. The data classification system is initially trained by applying a training data set to the data classification system and adjusting weights within the data classification system based on the training data set. The initial training data set includes multiple tuples, each tuple being a training instance (also referred to as training data) and a corresponding training label. Synthetic data is generated to augment the training data set by generating an entropy value for each of multiple training instances in the training data set. Two training instances are selected from the training data set based on the entropy values for the selected training instances. One selected training instance is selected from the minority class and the other training instance is selected from the majority class. A synthetic training instance is generated by combining the two selected training instances. A synthetic training label is generated for the synthetic training instance, and a tuple including the synthetic training instance and the synthetic training label is added to the initial training data set, resulting in an augmented training data set. One or more such synthetic training instances can be generated and added to the augmented training data set and the data classification system is then re-trained on the augmented training data set.

More specifically, a training system trains a data classification system by applying a training data set to the classification system and adjusting weights within the classification system based on the training data set. The training data set includes training data in the form of tuples, each tuple including a training instance (the training data to be classified) and a corresponding training label. The training label refers to a probability vector indicating, for each of multiple classes, the probability that the training data is in that class.

At first the training data set includes just an initial training data set. After initially training the classification system, a data augmentation system generates a synthetic training data set, which together with the initial training data forms an augmented training data set. The training system re-trains the classification system by applying the augmented training data set to the classification system and adjusting weights within the classification system based on the augmented training data set.

After the classification system is initially trained, at least two instances (typically all instances or a subset of the training instances set aside for verification) of the training data set are input to the classification system. The classification system generates a label for each such instance and provides the generated labels to the data augmentation system. For each label generated by the classification system, the data augmentation system also obtains the corresponding training data.

An entropy for a label or corresponding training instance is generated, which refers to the lack of predictability in the corresponding training instance. The entropies are used to select training instances from the initial training data set from which a synthetic training instance will be generated. In one or more implementations, the classification system classifies data into one of two classes. The training data set includes instances in both the minority class and the majority class. The class to which the majority of instances belongs is referred to as the majority class, and the class to which the minority of instances belongs is referred to as the minority class.

Two training instances from the training data set are sampled, one training instance from the minority class and one training instance from the majority class, based on the entropies of the training instances. In one or more implementations, instances are sampled based on a strategy favoring sampling of instances with lower entropies. In this strategy, the probability of sampling a particular instance from the majority class or the minority class is inversely proportional to the entropy of the instance. In such implementations both the instance sampled from the majority class and the instance sampled from the minority class typically have low entropy. The specific instance from a class that is sampled can be identified in a variety of different manners.

For example, the training instance having a lowest entropy that has not already been sampled is sampled. By way of another example, a count of how many synthetic training data instances are being generated by the data augmentation system is obtained. A set of instances from a class equal to that count that have the lowest entropies are selected. A training instance from that set of training instances that has not already been sampled is sampled according to various rules or criteria (e.g., randomly or pseudorandomly).

By way of yet another example, a random or pseudorandom number is generated as a probability value. An instance from a class is selected according to various rules or criteria (e.g., randomly or pseudorandomly). If the generated probability value exceeds the entropy of the selected instance, then that training instance is sampled. If the generated probability value does not exceed the entropy of the selected instance, then instances continue to be selected according to various rules or criteria (e.g., randomly or pseudorandomly) until an instance is selected for which the generated probability value does exceed the entropy of the instance.

Additionally or alternatively, training instances can be sampled based on a strategy favoring sampling of instances with higher entropies. In this strategy, the probability of sampling a particular instance from the majority class or the minority class is directly proportional to the entropy of the instance. In such implementations both the instance sampled from the majority class and the instance sampled from the minority class typically have high entropy. The specific instance from a class that is sampled can be identified in a variety of different manners.

For example, the training instance having the highest entropy that has not already been sampled is sampled. By way of another example, a count of how many synthetic training data instances are being generated by the data augmentation system is obtained. A set of instances from a class equal to that count that have the highest entropies are selected. A training instance from that set of instances that has not already been sampled is sampled according to various rules or criteria (e.g., randomly or pseudorandomly).

By way of yet another example, a random or pseudorandom number is generated as a probability value. An instance from a class is selected according to various rules or criteria (e.g., randomly or pseudorandomly). If the generated probability value does not exceed the entropy of the selected instance, then that training instance is sampled. If the generated probability value does exceed the entropy of the selected instance, then instances continue to be selected according to various rules or criteria (e.g., randomly or pseudorandomly) until an instance is selected for which the generated probability value does not exceed the entropy of the instance.

Additionally or alternatively, instances are sampled based on a strategy favoring sampling one instance with higher entropy and one instance with lower entropy. In this strategy, the probability of sampling a particular instance from one class is directly proportional to the entropy of the instance (and typically has high entropy) and the probability of sampling a particular instance from the other class is inversely proportional to the entropy of the instance (and typically has low entropy). Which of the minority class and the majority class has a probability of sampling a particular instance that is directly proportional to the entropy of the instance and which has a probability of sampling a particular instance that is inversely proportional to the entropy of the instance can be selected according to various rules or criteria (e.g., randomly or pseudorandomly).

The specific instance sampled from the class that has a probability of sampling a particular instance that is directly proportional to the entropy of the instance can be identified in a variety of different manners, such as any of the manners discussed above regarding the strategy favoring sampling of instances with higher entropies. The specific instance sampled from the class that has a probability of sampling a particular instance that is inversely proportional to the entropy of the instance can be identified in a variety of different manners, such as any of the manners discussed above regarding the strategy favoring sampling of instances with lower entropies.

A combination ratio indicating how to combine the sampled instances to generate the synthetic training instance is generated. In one or more implementations, the combination ratio is generated by sampling the combination ratio from a continuous probability distribution. The combination ratio can be sampled from various different probability distributions, such as a uniform distribution, a beta distribution, a Poisson distribution, and so forth.

The synthetic training instance is generated by combining the sampled instances based on the combination ratio. In one or more implementations, the synthetic training instance is generated based on a linear transform. Additionally or alternatively, the synthetic training instance can be generated in a different manners, such as based on a non-linear transform. The training label for the synthetic training instance can be generated using various different techniques, such as a weighted cross entropy technique or a one-hot label cross entropy technique.

A tuple including the synthetic training instance and the corresponding synthetic training data label is added to a synthetic training data set. This process is repeated for multiple additional training labels and corresponding training instances, resulting in multiple synthetic training instances being generated and multiple tuples being added to the synthetic training data set. The number of synthetic training instances being generated can be determined in a variety of different manners. For example, the number of synthetic training instances can be a percentage of the number of labels generated (e.g., 20% or 25%). By way of another example, the number of synthetic training instances can be a fixed amount, such as 1,000.

After the synthetic training instance is generated, the training system re-trains the classification system by applying the training data set to the classification system and adjusting weights within the classification system based on the training data set. In re-training the classification system, the training data set includes both the initial training data set and the synthetic training data set, which is also referred to as an augmented training data set. Accordingly, the classification system is re-trained on both the initial training data set and the synthetic training data.

This process of generating synthetic training instances and re-training the classification system can be repeated any number of times. In one or more implementations, this process is repeated a fixed number of times (e.g., 5 or 10 times). This fixed number can be determined empirically so as to allow the classification system to be well-trained but not over-trained. Additionally or alternatively, this process is repeated until a particular condition is satisfied, such as selected individual weights in the classification system converging.

The techniques discussed herein improve the technical field of data classification. Imbalanced data sets present problems for data classification systems as discussed above. By generating synthetic training instances as discussed herein, additional training instances that are in the minority class are generated, improving the training of the classification system and thus the classification accuracy and efficiency of the classification system. Furthermore, by selecting training instances to generate the synthetic training instance from both the minority class and the majority class based on their entropies, the imbalance in the initial training data set is not carried over to the synthetic training instances, such as would be done if selecting training instances at random.

Furthermore, the entropy based techniques for selecting training instances from which the synthetic training instance is to be generated provide specific techniques or rules for generating the synthetic training instance. These specific techniques or rules for generating the synthetic training instance to train the classification system improve the operation of the classification system, improving the data classification accuracy and efficiency of the classification system.

Term Descriptions

These term descriptions are provided for purposes of example only and are not intended to be construed as limiting on the scope of the claims.

The term "training instance" refers to an instance of data used to train a data classification system.

The term "training data set" refers to a set of training instances and corresponding training labels used to train a data classification system.

The term "minority class" refers to, for a training data set in which the classification categories are not approximately equally represented, the classification category to which the smallest number of training instances belong.

The term "majority class" refers to, for a training data set in which the classification categories are not approximately equally represented, the classification category to which the largest number of training instances belong.

The term "imbalanced training data set" refers to a training data set in which the classification categories are not approximately equally represented. For example, the majority class having at least twice as many training instances as the minority class.

The term "entropy" refers to the lack of predictability in a training label or corresponding training instance. A higher entropy indicates that the data classification system is more uncertain about which class to assign the training instance to than a lower entropy indicates.

The term "synthetic training instance" refers to a training instance that is not in an initial training data set but is generated from multiple training instances that are in the initial training data set.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the entropy based synthetic data generation for augmenting classification system training data described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 5.

The computing device 102 is illustrated as including a data augmentation system 104, a training system 106, and a classification system 108, each of which is implemented at least partially in hardware of the computing device 102. The computing device 102 receives input data 110 and the classification system 108 generates and outputs a classification result 112. The classification result 112 is an identification of one or more classes to which the input data 110 belongs.

In one or more implementations, the classification system 108 is a machine learning system. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

For example, the classification system 108 can employ one or more convolutional neural networks (CNNs). A CNN is formed from layers of nodes (i.e., neurons) and can include various layers such as an input layer, an output layer, and one or more hidden layers such as convolutional layers, pooling layers, activation layers, fully connected layers, normalization layers, and so forth.

The training system 106 trains the classification system 108 to generate classification results 112 for input data 110 using training data set 114 that is maintained in storage 116. The storage 116 can be any of a variety of different types of storage, such as random access memory (RAM), Flash memory, solid state drive, magnetic disk drive, and so forth. Initially, the training system 106 trains the classification system 108 by applying an initial set of training data 118 and adjusting weights within the classification system 108 based on the initial set of training data 118. The data augmentation system 104 generates a set of synthetic training data 120, after which the training system 106 re-trains the classification system 108 by applying both the initial set of training data 118 and the synthetic training data set 120, and adjusting weights within the classification system 108 based on both the initial set of training data 118 and the synthetic training data set 120.

Each training instance in the training data set 114, as well as the input data 110, is a vector having one or more elements each of which is a number. Each vector can represent any of a variety of different data, such as images, text and other characters, audio, and so forth. Non-number data can be converted to a vector of numbers using any of a variety of public or proprietary techniques, such as a word to vector technique, a document to vector technique, and so forth.

The data augmentation system 104 processes and transforms digital content maintained in storage 116. Such processing includes creation, based on the initial training data 118, of digital content that is the synthetic training data set 120. Although illustrated as implemented locally at the computing device 102, one or more of the data augmentation system 104, the training system 106, and the classification system 108 may also be implemented in whole or part via functionality available via a network 122, such as part of a web service or "in the cloud."

It should be noted that although the computing device 102 is illustrated as including the data augmentation system 104 and the training system 106, in one or more implementations a computing device need not include one or both of the data augmentation system 104 and the training system 106. Once the classification system 108 is trained, the data augmentation system 104 and the training system 106 are not needed.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Data Augmentation System Architecture

Figure 2:
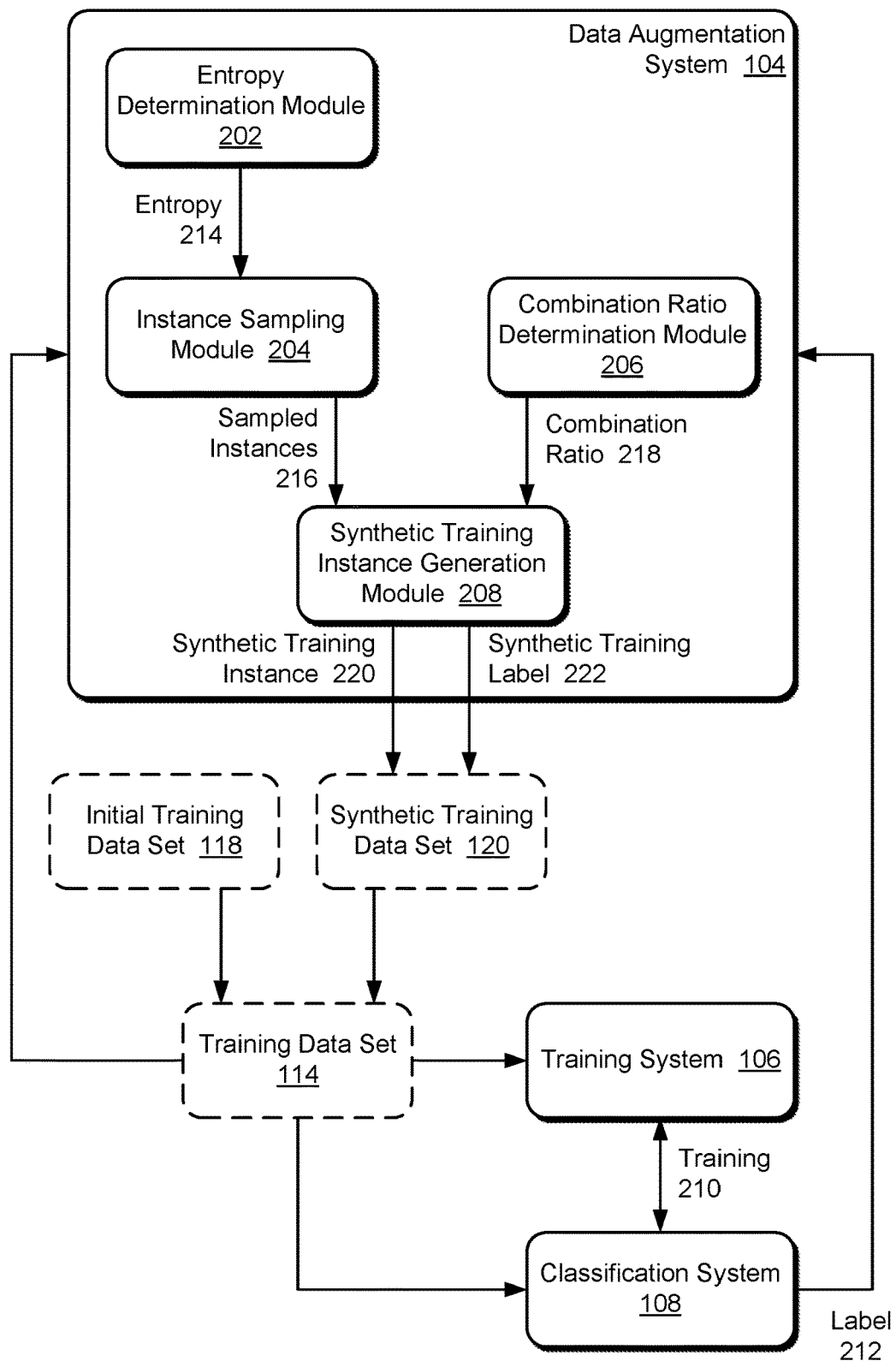
FIG. 2 is an illustration of an example architecture of a data augmentation system.

FIG. 2 is an illustration of an example architecture of a data augmentation system 104. The data augmentation system 104 includes an entropy determination module 202, an instance sampling module 204, a combination ratio determination module 206, and a synthetic training instance generation module 208. The data augmentation system 104 generates synthetic training instances that the training system 106 uses to train the classification system 108 as discussed in more detail below.

The training system 106 trains 210 the classification system 108 by applying the training data set 114 to the classification system 108 and adjusting weights within the classification system 108 based on the training data set 114. The training data set 114 includes training data in the form of tuples, each tuple including a training instance (the training data to be classified) and a corresponding training label. The training label refers to a probability vector indicating, for each of multiple classes, the probability that the training data is in that class. For example, if there are two classes then a training label of [0,1] indicates a 0% chance of the corresponding training data being in the first class and a 100% chance of the corresponding training data being in the second class.

The classification system 108 is trained, for example, by updating weights of filters in the classification system 108 (e.g., a fully-convolutional neural network) to minimize a loss between the label 212 generated by the classification system 108 for a training instance in the training data set 114 and the training label corresponding to the training instance. Any of a variety of different loss functions can be minimized, such as the cross-entropy loss function.

Initially, the training data set 114 includes just the initial training data set 118. After initially training the classification system 108, the data augmentation system 104 generates synthetic training data set 120, which is included in the training data set 114. The training system 106 re-trains 210 the classification system 108 by applying the training data set 114 (including both the initial training data set 118 and the synthetic training data set 120) to the classification system 108 and adjusting weights within the classification system 108 based on the training data set 114.

The initial training data set 118 is an imbalanced training data set, which refers to the classification categories not being approximately equally represented. An imbalanced training data set refers to a training data set that has, for example, at least twice as many training instances in the majority class as are in the minority class. The data augmentation system 104 generates synthetic training instances to account for this imbalance and better train the classification system 108.

After the classification system 108 is initially trained, at least two instances (typically all instances or a subset of the training instances set aside for verification) of the training data set 114 are input to the classification system 108. The classification system 108 generates a label 212 for each instance of the training data set 114 that the classification system 108 receives. This generated label 212, as discussed above, is a probability vector indicating, for each of multiple classes, the probability that the training instance is in that class. These generated labels 212 are provided to the data augmentation system 104. It should be noted the labels 212 are labels generated by the classification system 108 rather than the training labels from the training data set 114.

The training data set 114 is also provided to the data augmentation system 104. Accordingly, for each label 212 generated by the classification system 108, the data augmentation system 104 also has the corresponding training data. For example, the training instances in the training data set 114 can be provided to the data augmentation system 104 in the same order as the instances are provided to the classification system 108, allowing data augmentation system 104 to know which label 212 corresponds to which training instance of the training data set 114.

The entropy determination module 202 generates the entropy 214 for each label 212 and corresponding training instance. The entropy for a label 212 or the corresponding training instance refers to the lack of predictability in the corresponding training instance. A higher entropy indicates that the classification system 108 is more uncertain about which class to assign the corresponding training instance to than a lower entropy indicates. In one or more implementations, the entropy determination module 202 generates the entropy E as:

$$E = \Sigma \vec{p} * \log \vec{p}$$

where $\vec{p}$ refers to a probability vector (the label 212). Accordingly, the entropy E of an instance is the sum of the value $p_i * \log p_i$ for each element $p_i$ in the probability vector $\vec{p}$ that includes i elements.

The entropy determination module 202 provides the generated entropies 214 to the instance sampling module 204. In one or more implementations, the classification system 108 classifies data into one of two classes. The training data set 114 includes instances in both the minority class and the majority class. The class to which the majority of instances belongs is referred to as the majority class, and the class to which the minority of instances belongs is referred to as the minority class.

The instance sampling module 204 samples (also referred to as selects) two instances from the training data set 114, one instance from the minority class and one instance from the majority class, based on the entropies 214. The instance sampling module 204 can sample each instance in a variety of different manners.

In one or more implementations, the instance sampling module 204 employs a strategy favoring sampling of instances with lower entropies. In this strategy, the probability of sampling a particular instance from the majority class or the minority class is inversely proportional to the entropy of the instance. In such implementations both the instance sampled from the majority class and the instance sampled from the minority class typically have low entropy. The specific instance from a class that is sampled can be identified in a variety of different manners.

For example, the instance sampling module 204 samples an instance from a class having a lowest entropy that has not already been sampled. If multiple instances have the same lowest entropy then one of those multiple instances can be selected according to various rules or criteria (e.g., randomly or pseudorandomly).

By way of another example, the instance sampling module 204 obtains a count of how many synthetic training data instances are being generated by the data augmentation system 104. The instance sampling module 204 can select a set of instances from a class equal to that count that have the lowest entropies. The instance sampling module 204 can then sample an instance from that set of instances that has not already been sampled according to various rules or criteria (e.g., randomly or pseudorandomly).

By way of yet another example, the instance sampling module 204 can generate a random or pseudorandom number as a probability value. The instance sampling module 204 can then select an instance from a class according to various rules or criteria (e.g., randomly or pseudorandomly). If the generated probability value exceeds the entropy of the selected instance, then the instance sampling module 204 samples that instance. If the generated probability value does not exceed the entropy of the selected instance, then the instance sampling module 204 continues to select instances according to various rules or criteria (e.g., randomly or pseudorandomly) until an instance is selected for which the generated probability value does exceed the entropy of the instance.

Figure 3:
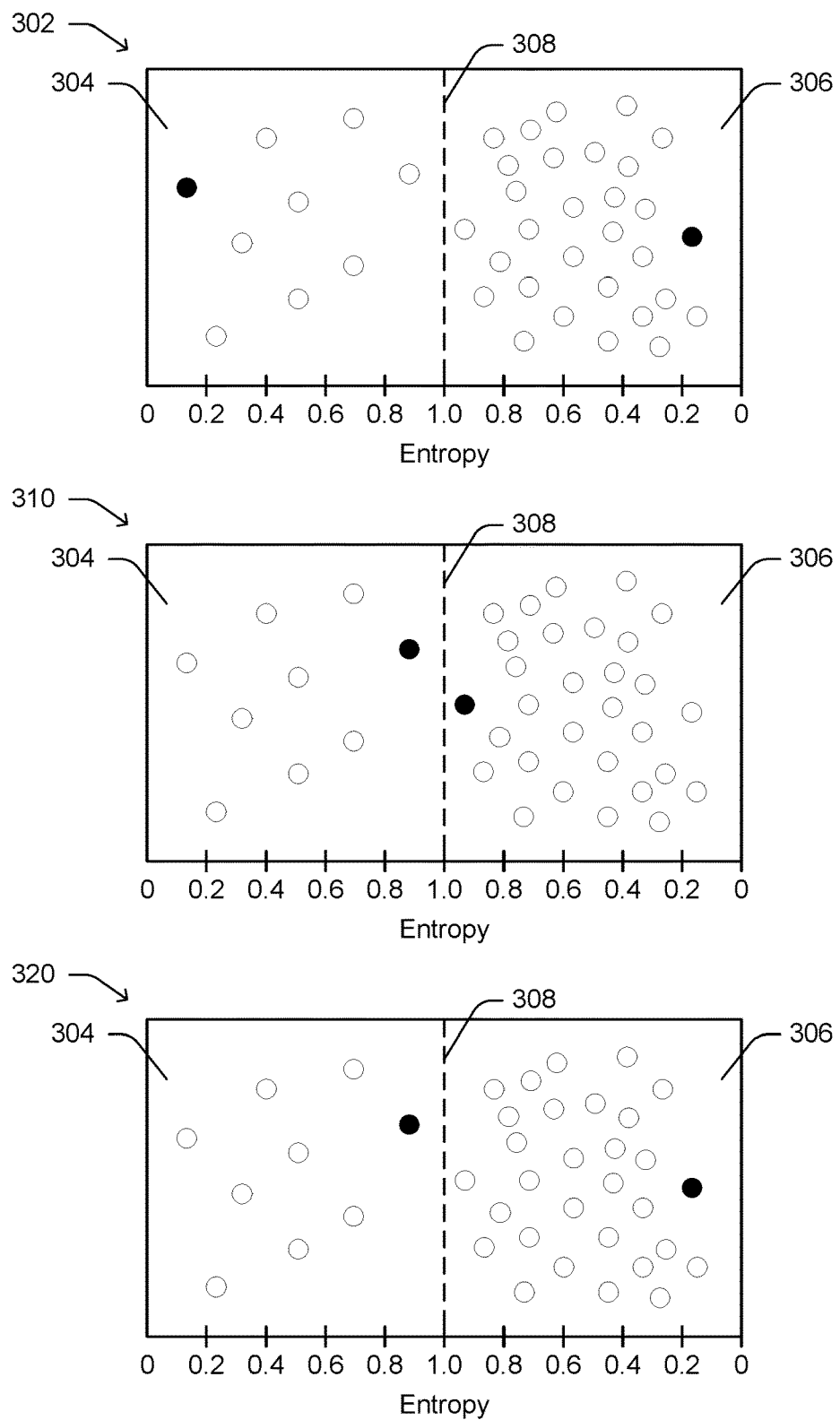
FIG. 3 illustrates examples of selecting instances of a class.

FIG. 3 illustrates examples of selecting instances of a class. In an example 302, two classes are illustrated as portions 304 and 306. For example, portion 304 can be the minority class and portion 306 can be the majority class. The entropies of multiple instances in each class are illustrated as circles. Entropy values are shown along the horizontal axis. A decision boundary 308 is also illustrated—the further an entropy is from the decision boundary 308 the lower the entropy (and thus the lower uncertainty that the classification system 108 has about which class to assign the corresponding data to). Entropies of instances that are sampled by the instance sampling module 204 are shown in black (filled in circles) while instances that are not sampled by the instance sampling module 204 are shown in white (empty in circles). As illustrated the two instances that are sampled, one from each class, have low entropy. The example 302 is an example of the strategy favoring sampling of instances with lower entropies.

Returning to FIG. 2, in one or more implementations, the instance sampling module 204 employs a strategy favoring sampling of instances with higher entropies. In this strategy, the probability of sampling a particular instance from the majority class or the minority class is directly proportional to the entropy of the instance. In such implementations both the instance sampled from the majority class and the instance sampled from the minority class typically have high entropy. The specific instance from a class that is sampled can be identified in a variety of different manners.

For example, the instance sampling module 204 samples an instance from a class having a highest entropy that has not already been sampled. If multiple instances have the same highest entropy then one of those multiple instances can be selected according to various rules or criteria (e.g., randomly or pseudorandomly).

By way of another example, the instance sampling module 204 obtains a count of how many synthetic training data instances are being generated by the data augmentation system 104. The instance sampling module 204 can select a set of instances from a class equal to that count that have the highest entropies. The instance sampling module 204 can then sample an instance from that set of instances that has not already been sampled according to various rules or criteria (e.g., randomly or pseudorandomly).

By way of yet another example, the instance sampling module 204 can generate a random or pseudorandom number as a probability value. The instance sampling module 204 can then select an instance from a class according to various rules or criteria (e.g., randomly or pseudorandomly). If the generated probability value does not exceed the entropy of the selected instance, then the instance sampling module 204 samples that instance. If the generated probability value does exceed the entropy of the selected instance, then the instance sampling module 204 continues to select instances according to various rules or criteria (e.g., randomly or pseudorandomly) until an instance is selected for which the generated probability value does not exceed the entropy of the instance.

Returning to FIG. 3, an example 310 illustrates two classes as portions 304 and 306, a decision boundary 308, and the entropies of multiple instances in each class are illustrated as circles, analogous to example 302 discussed above. The example 310 differs from the example 302 in that the two instances that are sampled, one from each class, have high entropy. The example 310 is an example of the strategy favoring sampling of instances with lower entropies.

Returning to FIG. 2, in one or more implementations, the instance sampling module 204 employs a strategy favoring sampling one instance with higher entropy and one instance with lower entropy. In this strategy, the probability of sampling a particular instance from one class is directly proportional to the entropy of the instance (and typically has high entropy) and the probability of sampling a particular instance from the other class is inversely proportional to the entropy of the instance (and typically has low entropy). Which of the minority class and the majority class has a probability of sampling a particular instance that is directly proportional to the entropy of the instance and which has a probability of sampling a particular instance that is inversely proportional to the entropy of the instance can be selected according to various rules or criteria (e.g., randomly or pseudorandomly).

Which of the minority class and the majority class has a probability of sampling a particular instance that is directly proportional to the entropy of the instance and which has a probability of sampling a particular instance that is inversely proportional to the entropy of the instance can be selected for each instance of synthetic training data being generated, or alternatively for multiple instances of synthetic training data being generated (e.g., until the classification system 108 is re-trained as discussed in more detail below). In one or more implementations, which of the minority class and the majority class has a probability of sampling a particular instance that is directly proportional to the entropy of the instance and which has a probability of sampling a particular instance that is inversely proportional to the entropy of the instance is selected randomly or pseudorandomly for each instance of synthetic training data being generated.

The specific instance sampled from the class that has a probability of sampling a particular instance that is directly proportional to the entropy of the instance can be identified in a variety of different manners, such as any of the manners discussed above regarding the strategy favoring sampling of instances with higher entropies. The specific instance sampled from the class that has a probability of sampling a particular instance that is inversely proportional to the entropy of the instance can be identified in a variety of different manners, such as any of the manners discussed above regarding the strategy favoring sampling of instances with lower entropies.

Returning to FIG. 3, an example 320 illustrates two classes as portions 304 and 306, a decision boundary 308, and the entropies of multiple instances in each class are illustrated as circles, analogous to example 302 discussed above. The example 310 differs from the example 302 in that the instance sampled from class 304 has high entropy and the instance sampled from class 306 has low entropy. The example 320 is an example of the strategy favoring sampling one instance with higher entropy and one instance with lower entropy.

Returning to FIG. 2, the instance sampling module 204 provides the two sampled instances 216 to the synthetic training instance generation module 208. In addition, the combination ratio determination module 206 generates a combination ratio 218 that indicates to the synthetic training instance generation module 208 how to combine the sampled instances 216 to generate the synthetic training instance 220, as discussed in more detail below. The combination ratio 218 controls the extent of overlap between the two sampled instances 216 in generating the synthetic training instance 220. In one or more implementations, the combination ratio determination module 206 generates the combination ratio 218 by sampling the combination ratio 218 from a continuous probability distribution. The combination ratio can be sampled from various different probability distributions, such as a uniform distribution, a beta distribution (e.g., with an alpha parameter of 0.2 and a beta parameter of 0.2), a Poisson distribution (e.g., with a parameter in the range of 0.4 to 0.6), and so forth. These probability distributions can be linear or non-linear probability density functions.

The synthetic training instance generation module 208 generates a synthetic training instance 220 by combining the sampled instances 216 based on the combination ratio 218. In one or more implementations, the synthetic training instance generation module 208 generates the synthetic training instance 220 ($\tilde{X}$) and a synthetic training label 222 ($\tilde{Y}$) as a linear transform, generated as follows:

$$\tilde{X} = \lambda X_1 + (1-\lambda)X_2$$

$$\tilde{Y} = [\lambda, 1-\lambda]$$

where $\lambda$ refers to the combination ratio 218, $\tilde{Y}$ refers to the synthetic training label 222 being generated, $\tilde{X}$ refers to the synthetic training instance 220 being generated, $X_1$ refers to the sampled instance 216 from one class, and $X_2$ refers to the sampled instance 216 from the other class. If $\tilde{X}$ is a vector with multiple elements, the value of each element is generated as $\lambda X_1 + (1-\lambda)X_2$. Which of the minority class and the majority class includes the sampled instance $X_1$ and which includes the sampled instance $X_2$ can be selected according to various rules or criteria (e.g., randomly or pseudorandomly). Which of the minority class and the majority class includes the sampled instance $X_1$ and which includes the sampled instance $X_2$ can be selected for each synthetic training instance 220 being generated, or alternatively for multiple instances of synthetic training instances 220 being generated (e.g., until the classification system 108 is re-trained as discussed in more detail below).

As an example of the linear transform, assume that $X_1$=[1, 2, 3] and $X_2$=[4, 5, 6], and $\lambda$=0.4. So:

$\lambda X_1$=0.4*[1,2,3]=[0.4,0.8,1.2]

$(1-\lambda)X_2$=(1-0.4)*[4,5,6]=[2.4,3.0,3.6]

Accordingly, $\tilde{X}$=[0.4, 0.8, 1.2]+[2.4, 3.0, 3.6]=[2.8, 3.8, 4.8]. The training label corresponding to $\tilde{X}$ is $\tilde{Y}$=[$\lambda$, 1-$\lambda$]=[0.4, 0.6].

Additionally or alternatively, the synthetic training instance generation module 208 generates the synthetic training instance 220 in different manners, such as generating the synthetic training instance 220 as a non-linear transform. In such situations, the synthetic training instance generation module 208 generates the synthetic training instance 220 ($\tilde{X}$) and the synthetic training label 222 ($\tilde{Y}$) as follows:

$$\tilde{X} = \frac{p(X_1 - \mu_1) + (1-p)(X_2 - \mu_2)}{\sqrt{p^2 + (1-p)^2}}$$

$$p = \frac{1}{1 + \frac{\sigma_1}{\sigma_2} \cdot \frac{1-\lambda}{\lambda}}$$

$$\tilde{Y} = [\lambda, 1-\lambda]$$

where $\lambda$ refers to the combination ratio 218, $\tilde{Y}$ refers to the synthetic training label 222 being generated, $\tilde{X}$ refers to the synthetic training instance 220 being generated, $X_1$ refers to the sampled instance 216 from a first class, $X_2$ refers to the sampled instance 216 from a second class, $\mu_1$ refers to the mean of data values in the first class, $\mu_2$ refers to the mean of data values in the second class, $\sigma_1$ refers to the standard deviation of data values in the first class, and $\sigma_2$ refers to the standard deviation of data values in the second class. If $\tilde{X}$ is a vector with multiple elements, the value of each element is generated using these equations (with $X_1$ and $X_2$ representing each element). Which of the minority class and the majority class includes the sampled instance $X_1$ and which includes the sampled instance $X_2$ can be selected according to various rules or criteria (e.g., randomly or pseudo-randomly). Which of the minority class and the majority class includes the sampled instance $X_1$ and which includes the sampled instance $X_2$ can be selected for each synthetic training instance 220 being generated, or alternatively for multiple instances of synthetic training instances 220 being generated (e.g., until the classification system 108 is re-trained as discussed in more detail below).

In the examples above, the training label Y is discussed as being generated as $\tilde{Y}$=[$\lambda$, 1-$\lambda$], referred to as a weighted cross entropy technique. Additionally or alternatively, the training label $\tilde{Y}$ is generated in other manners, such as using a one-hot label cross entropy technique as follows:

$\tilde{Y}$=[0,1],$\lambda$<0.5

$\tilde{Y}$=[1,0],$\lambda$≥0.5 where [0,1] refers to the label of the minority class and [1,0] refers to the label of the majority class.

Regardless of the manner in which the synthetic training instance generation module 208 generates the synthetic training instance 220 and the corresponding synthetic training label 222, the synthetic training instance generation module 208 generates the synthetic training instance 220 and the synthetic training label 222 as a tuple including the synthetic training data $\tilde{X}$ and the corresponding synthetic training data label $\tilde{Y}$. The synthetic training instance generation module 208 adds this synthetic training instance 220 to the synthetic training data set 120.

This process is repeated for multiple additional labels 212, resulting in multiple synthetic training instances 220 being generated and multiple new tuples being added to the synthetic training data set 120. In one or more implementations, different training instances are sampled for each synthetic training instance 220, thus resulting in the synthetic training instances 220 being generated from a first collection of training instances (e.g., from the minority class) and a second collection of training instances (e.g., from the majority class). Additionally or alternatively, the same training instance can be sampled and used to generate multiple synthetic training instances 220.

The number of synthetic training instances 220 being generated can be determined in a variety of different manners. For example, the number of synthetic training instances 220 can be a percentage of the number of labels 212 generated (e.g., 20% or 25%). By way of another example, the number of synthetic training instances 220 can be a fixed amount, such as 1,000. This percentage or fixed amount can be selected to allow for a significant number of synthetic training instances 220 to be generated while still keeping with the strategies (e.g., favoring sampling of instances with lower entropies, favoring sampling of instances with higher entropies, favoring sampling one instance with higher entropy and one instance with lower entropy) discussed above.

The synthetic training data 120 is added to the training data set 114, so the training data set 114 becomes an augmented training data set. The training system 106 re-trains 210 the classification system 108 by applying the training data set 114 to the classification system 108 and adjusting weights within the classification system 108 based on the training data set 114. In re-training the classification system 108 the training data set 114 includes both the initial training data set 118 and the synthetic training data set 120. Accordingly, the classification system 108 is re-trained on both the initial training data set 118 and the synthetic training data 120.

Additionally or alternatively, the training data set 114 can include the synthetic training data set 120 but not the initial training data set 118. In such situations, the classification system 108 is re-trained on just the synthetic training data 120. The classification system 108 can optionally be then re-trained again using the initial training data set 118, followed by generation of a new synthetic training data set 120 and again re-training of the classification system 108 on the new synthetic training data set 120.

This process of generating synthetic training instances 220 and re-training the classification system 108 can be repeated any number of times. In one or more implementations, this process is repeated a fixed number of times (e.g., 5 or 10 times). This fixed number can be determined empirically so as to allow the classification system 108 to be well-trained but not over-trained. Additionally or alternatively, this process is repeated until a particular condition is satisfied, such as selected individual weights in the classification system 108 converging.

In one or more implementations, each time new synthetic training instances are generated after the classification system 108 is re-trained, the new synthetic training instances are added to the augmented training data set. Accordingly, the augmented training data set includes the synthetic training instances generated after each re-training of the classification system. Additionally or alternatively, after one or more re-trainings of the classification system 108 the new synthetic training instances are added to a version of the training data set 114 that includes only the initial training data set 118. Accordingly, the augmented training data set includes the most recently generated synthetic training instances but does not include previously generated synthetic training instances (synthetic training instances generated prior to the most recent re-training of the classification system 108).

In the discussions above, reference is made to a classification system 108 that classifies input data 110 into one of two different classes. It should be noted, however, that the techniques discussed herein can apply analogously to a classification system that classifies input data 110 into three or more classes. In such situations, synthetic training instances and corresponding synthetic training labels are generated as discussed above for two of the classes but with the labels (probability vectors) for the sampled training instances having or being set to values of 0 for all elements but those corresponding to the two classes. For the elements corresponding to those two classes, the labels have values that add up to 1. For example, one-hot encoding is used. If the labels are not already in one-hot encoding then the labels are converted to one-hot encoding (e.g., of the elements in the two labels corresponding to the two classes in the pairing, the larger is changed to 1 and the smaller is changed to 0).

In situations in which the classification system 108 classifies the input data 110 into three or more classes there are multiple permutations of two classes from each training instance. For example, if there are 3 classes then there are 3 possible pairings of two classes, if there are 4 classes then there are 6 possible pairings of two classes, if there are 5 classes then there are 10 possible pairings of two classes, and so forth. A synthetic training instance and synthetic training label can be generated from each possible pairings of two classes or only those pairings for which the two classes are imbalanced (the two classes are not approximately equally represented).

For example, assume that the classification system 108 classifies the input data 110 into four classes. The classification system 108 selects a pairing of the four classes, such as the first class and the third class. Two training instances are sampled in any of the manners discussed above.

The synthetic training instance generation module 208 generates the synthetic training instance 220 ($\tilde{X}$) as discussed above using a linear transform or a non-linear transform. For example, the synthetic training instance 220 ($\tilde{X}$) is generated using one of the following:

$$\tilde{X} = \lambda X_1 + (1-\lambda)X_2$$

$$\tilde{X} = \frac{p(X_1 - \mu_1) + (1-p)(X_2 - \mu_2)}{\sqrt{p^2 + (1-p)^2}}$$

The synthetic training instance generation module 208 generates the synthetic training label 222 ($\tilde{Y}$) as follows:

$$\tilde{Y} = \lambda Y_1 + (1-\lambda)Y_2$$

where $\tilde{Y}$ refers to the synthetic training label 222 being generated, $Y_1$ refers to the training label corresponding to the sampled instance 216 from the first class in the pairing, and $Y_2$ refers to the training label corresponding to the sampled instance 216 from the second class in the pairing.

For example, assume that the combination ratio 218 is four ($\lambda$=0.4), that $Y_1$=[1, 0, 0, 0] and $Y_2$=[0, 0, 1, 0]. Accordingly, the synthetic training label 222 is $\tilde{Y}$=0.4*[1, 0, 0, 0]+(1+0.4)*[0, 0, 1, 0]=[0.4, 0, 0.6, 0].

By way of another example, assume that the code repository 218 is four ($\lambda$=0.4), that $Y_1$=[0.3, 0.3, 0.2, 0.2] and $Y_2$=[0.25, 0.4, 0.25, 0.1] and. The elements of $Y_1$ corresponding to the two classes that are not in the pairing (the second and fourth classes in this example) are set to 0, and the values corresponding to the two classes that are in the pairing (the first and third classes) are converted to one-hot encoding. Accordingly, $Y_1$ is changed to $Y_1$=[1, 0, 0, 0] (because 0.3 is larger than 0.25) and $Y_2$ is changed to $Y_2$=[0, 0, 1, 0] (because 0.25 is larger than 0.2). Thus, the synthetic training label 222 is $\tilde{Y}$=0.4*[1, 0, 0, 0]+(1−0.4)*[0, 0, 1, 0]=[0.4, 0, 0.6, 0].

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 4:
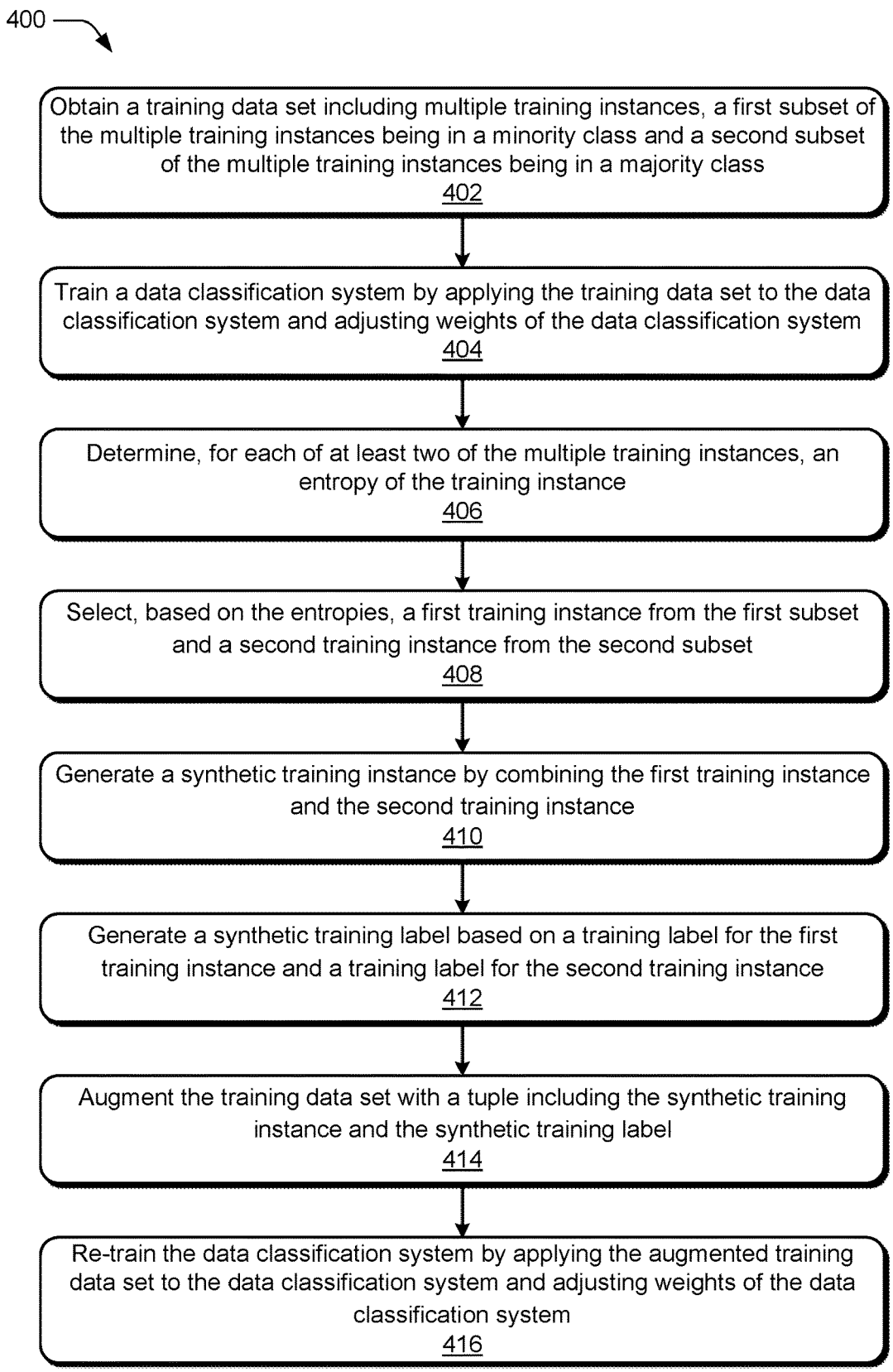
FIG. 4 is a flow diagram depicting a procedure in an example implementation of entropy based synthetic data generation for augmenting classification system training data.

FIG. 4 is a flow diagram depicting a procedure in an example 400 implementation of entropy based synthetic data generation for augmenting classification system training data. In this example, a training data set including multiple training instances is obtained (block 402). Each training instance includes training data and has a corresponding training label. A first subset of the multiple training instances is in a minority class and a second subset of the multiple training instances is in a majority class.

A data classification system is trained by applying the training data set to the data classification system and adjusting weights within the data classification system based on the training data set (block 404). The data classification system is initially trained on an initial training data set.

For each of at least two of the multiple training instances, an entropy of the training instance is determined (block 406). The entropy refers to the lack of predictability in the training instance. A higher entropy indicates that the data classification system is more uncertain about which class to assign the training instance to than a lower entropy indicates.

A first training instance from the first subset and a second training instance from the second subset are selected based on the entropies of the training instances (block 408). These training instances can be selected according to various strategies as discussed above, such as selecting at least two of the multiple training instances with low entropies, selecting at least two of the multiple training instances with high entropies, and selecting at least one of the multiple training instances with a low entropy and at least one of the multiple training instances with a high entropy.

A synthetic training instance is generated by combining the first training instance and the second training instance (block 410). The first training instance and the second training instance can be combined in various manners as discussed above, such as with a linear transform or a non-linear transform.

A synthetic training label for the synthetic training instance is generated based on a training label for the first training instance and a training label for the second training instance (block 412). The synthetic training label can be generated in various manners as discussed above, such as with a weighted cross entropy technique or a one-hot label cross entropy technique.

The training data set is augmented with a tuple including the synthetic training instance and the synthetic training label, resulting in an augmented training data set (block 414).

The data classification system is re-trained by applying the augmented training data set to the data classification system and adjusting weights within the data classification system based on the augmented training (block 416). In one or more implementations, the data classification system is re-trained by applying both the augmented training data set and the initial training data set to the data classification system and adjusting weights within the data classification system based on both the augmented training data set and the initial training data set.

Example System and Device

Figure 5:
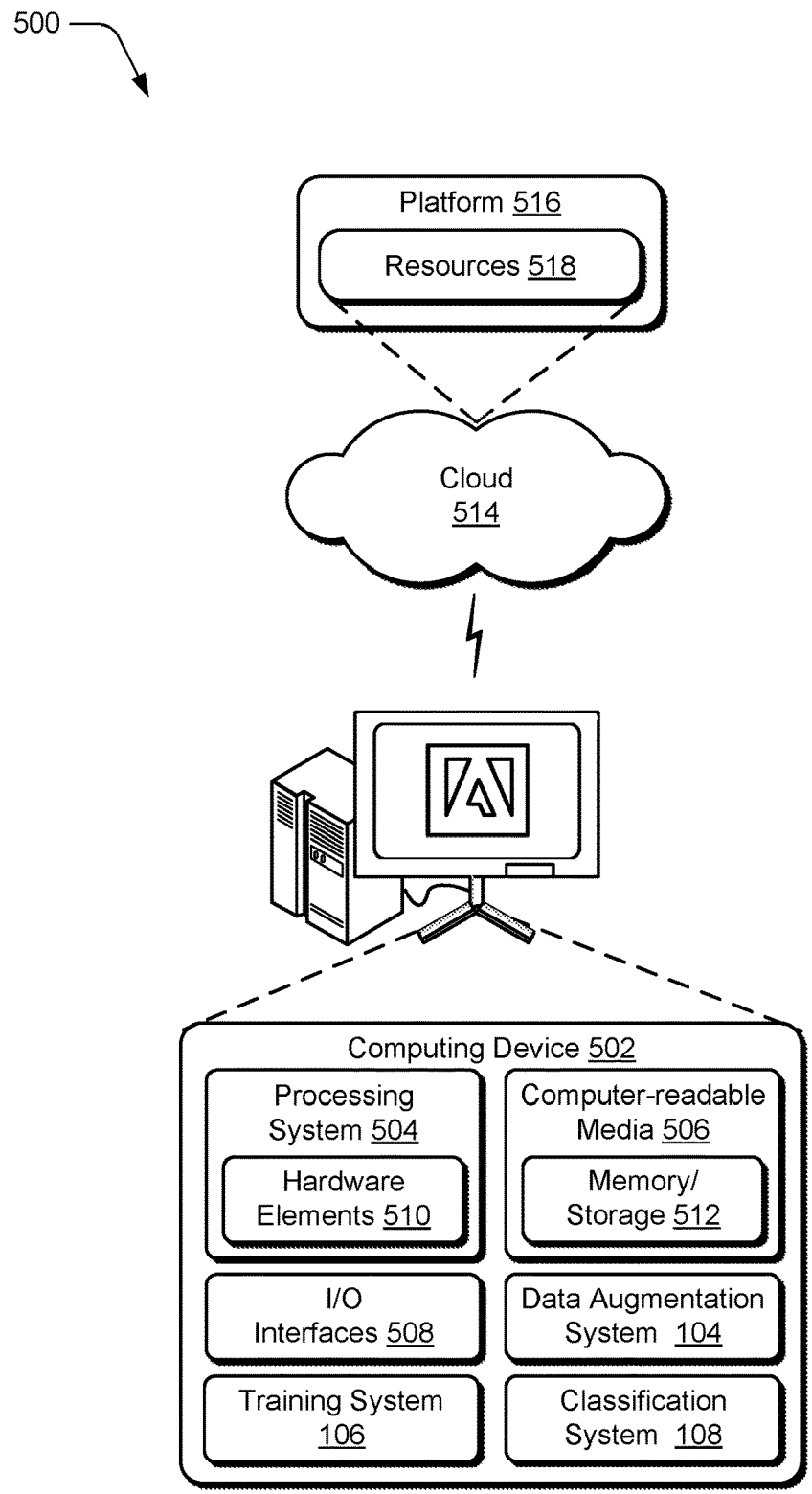
FIG. 5 illustrates an example system including various components of an example device that can be implemented as any type of computing device as described and/or utilized with reference to FIGS. 1-4 to implement aspects of the techniques described herein.

FIG. 5 illustrates an example system generally at 500 that includes an example computing device 502 that is representative of one or more computing systems and/or devices that may implement the various techniques described herein. This is illustrated through inclusion of the segment targeting system 102. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a training data generation digital medium environment, a method comprising:
obtaining a training data set including multiple training instances, each training instance comprising training data and having a corresponding training label, a first subset of the multiple training instances being in a minority class and a second subset of the multiple training instances being in a majority class;
training a data classification system by applying the training data set to the data classification system and adjusting weights within the data classification system based on the training data set;
determining, for each of at least two of the multiple training instances, an entropy of the training instance;
selecting, based on the entropies of the training instances, a first training instance from the first subset and a second training instance from the second subset;
generating a synthetic training instance by combining the first training instance and the second training instance;
generating a synthetic training label for the synthetic training instance based on a training label for the first training instance and a training label for the second training instance;
augmenting the training data set with a tuple including the synthetic training instance and the synthetic training label, resulting in an augmented training data set; and
re-training the data classification system by applying the augmented training data set to the data classification system and adjusting weights within the data classification system based on the augmented training data set.

2. The method as recited in claim 1, the selecting comprising selecting, as the at least two of the multiple training instances, at least two of the multiple training instances with low entropies.

3. The method as recited in claim 1, the selecting comprising selecting, as the at least two of the multiple training instances, at least two of the multiple training instances with high entropies.

4. The method as recited in claim 1, the selecting comprising selecting, as the at least two of the multiple training instances, at least one of the multiple training instances with a low entropy and at least one of the multiple training instances with a high entropy.

5. The method as recited in claim 1, the first training instance comprising a first vector including multiple elements, the second training instance comprising a second vector including multiple elements, and the combining the first training instance and the second training instance comprising adding a product of the first vector and a combination ratio to a product of the second vector and one minus the combination ratio.

6. The method as recited in claim 1, the combining the first training instance and the second training instance comprising performing a non-linear transformation on the first training instance and the second training instance.

7. The method as recited in claim 1, the augmenting the training data set with the tuple comprising adding the tuple to the training data set.

8. The method as recited in claim 1, further comprising repeating the determining, the selecting, the generating the synthetic training instance, and the generating the synthetic training label multiple times to augment the training data set with multiple tuples.

9. The method as recited in claim 8, the selecting comprising:
selecting, as the at least two of the multiple training instances for generating a first synthetic training instance, a first training instance from the first subset with a low entropy and a second training instance from the second subset with a high entropy; and
selecting, as the at least two of the multiple training instances for generating a second synthetic training instance, a third training instance from the second subset with a low entropy and a fourth training instance from the first subset with a high entropy.

10. In a training data generation digital medium environment, a computing device comprising:
a processor; and
computer-readable storage media having stored thereon multiple instructions that, responsive to execution by the processor, cause the processor to perform operations including:
obtaining an imbalanced training data set having a minority class and a majority class, the imbalanced training data set including multiple training instances each of which includes training data and has a corresponding training label, a first subset of the multiple training instances belonging to the minority class and a second subset of the multiple training instances belonging to the majority class;
training a data classification system on the imbalanced training data set;
determining, for each of at least two of the multiple training instances, an entropy of the training instance;
selecting, based on the entropies of the training instances, a first training instance from the first subset and a second training instance from the second subset;
generating a synthetic training instance by combining the first training instance and the second training instance;
generating a synthetic training label for the synthetic training instance based on a training label for the first training instance and a training label for the second training instance;
adding a tuple to the training data set, the tuple including the synthetic training instance and the synthetic training label, resulting in an augmented training data set; and
re-training the data classification system by applying the augmented training data set to the data classification system and adjusting weights within the data classification system based on the augmented training data set.

11. The computing device as recited in claim 10, the selecting comprising selecting, as the at least two of the multiple training instances, at least two of the multiple training instances with low entropies.

12. The computing device as recited in claim 10, the selecting comprising selecting, as the at least two of the multiple training instances, at least two of the multiple training instances with high entropies.

13. The computing device as recited in claim 10, the selecting comprising selecting, as the at least two of the multiple training instances, at least one of the multiple training instances with a low entropy and at least one of the multiple training instances with a high entropy.

14. The computing device as recited in claim 10, the first training instance comprising a first vector including multiple elements, the second training instance comprising a second vector including multiple elements, and the combining the first training instance and the second training instance comprising adding a product of the first vector and a combination ratio to a product of the second vector and one minus the combination ratio.

15. The computing device as recited in claim 10, the operations further comprising repeating the determining, the selecting, the generating the synthetic training instance, the generating the synthetic training label, and the adding multiple times to augment the training data set with multiple tuples.

16. The computing device as recited in claim 15, the selecting comprising:
selecting, as the at least two of the multiple training instances for generating a first synthetic training instance, a first training instance from the first subset with a low entropy and a second training instance from the second subset with a high entropy; and
selecting, as the at least two of the multiple training instances for generating a second synthetic training instance, a third training instance from the second subset with a low entropy and a fourth training instance from the first subset with a high entropy.

17. A system comprising:
a classification system, implemented at least in part in hardware, to receive input data, classify the input data, and output a label indicating a classification of the input data;
a training system, implemented at least in part in hardware, to train the classification system on an initial training data set including multiple training instances, each training instance comprising training data and having a corresponding training label, a first subset of the multiple training instances being in a minority class and a second subset of the multiple training instances being in a majority class;
means for generating, based on entropies of a first collection of training instances from the first subset and entropies of a second collection of training instances from the second subset, a synthetic training data set including multiple synthetic training instances to augment the initial training data set; and
the training system being further to re-train the classification system on the initial training data set and the augmented training data set.

18. The system as recited in claim 17, the means for generating further including means for selecting, as the first collection of training instances and the second collection of training instances, training instances with low entropies.

19. The system as recited in claim 17, the means for generating further including means for selecting, as the first collection of training instances and the second collection of training instances, training instances with high entropies.

20. The system as recited in claim 17, the means for generating further including means for selecting, as the first collection of training instances, training instances with low entropies and selecting, as the second collection of training instances, training instances with high entropies.

* * * * *